United States Patent
Schoonbrood et al.

(10) Patent No.: US 6,239,227 B1
(45) Date of Patent: May 29, 2001

(54) WATER-SOLUBLE OR WATER-DISPERSIBLE GRAFTED COPOLYMERS

(75) Inventors: Harold Schoonbrood, Fitzroy North (AU); Vance Bergeron; Jean-Pierre Marchand, both of Lyons (FR)

(73) Assignee: Rhodia Chimie, Boulogne Billancourt Cedex (FR)

(*) Notice: Subject to any disclaimer, the term of this patent is extended or adjusted under 35 U.S.C. 154(b) by 0 days.

(21) Appl. No.: 09/350,615

(22) Filed: Jul. 9, 1999

Related U.S. Application Data

(60) Provisional application No. 60/092,123, filed on Jul. 9, 1998.

(51) Int. Cl.$^7$ ............... C08F 261/00; C08F 261/04; C08F 271/00; C08F 273/00

(52) U.S. Cl. ............... 525/283; 525/291; 525/293; 525/296; 525/301; 525/287; 525/404; 525/919

(58) Field of Search ..................... 525/283, 291, 525/293, 296, 301, 287, 404, 919

(56) References Cited

U.S. PATENT DOCUMENTS

| | | | |
|---|---|---|---|
| 4,612,352 | 9/1986 | Schafer | 525/404 |
| 5,091,356 | 2/1992 | Nakashima | 503/200 |
| 5,132,284 | 7/1992 | Tsai | 507/110 |
| 5,166,276 | 11/1992 | Hayama | 525/359 |
| 5,739,212 | 4/1998 | Wutz | 525/411 |

OTHER PUBLICATIONS

International Search Report for PCT/EP99/05024.

*Primary Examiner*—Jeffrey Mullis
(74) *Attorney, Agent, or Firm*—Jean-Louis Seugnet

(57) ABSTRACT

Novel water-soluble or water-dispersible grafted copolymers comprising polyvinyl alcohol, vinylpyrrolidone or oxyalkylene oligomer or polymer units and hydrophilic copolymer units derived from ethylenically unsaturated anionic and amphoteric water-soluble monomers.

22 Claims, No Drawings

WATER-SOLUBLE OR WATER-DISPERSIBLE GRAFTED COPOLYMERS

This application claims priority from U.S. Ser. No. 60/092,123, filed Jul. 9, 1998.

The present invention relates to novel water-soluble or water-dispersible grafted copolymers comprising polyvinyl alcohol, vinylpyrrolidone or oxyalkylene oligomer or polymer units and hydrophilic random copolymer units derived from ethylenically unsaturated anionic and amphoteric water-soluble monomers.

According to the invention, the novel water-soluble or water-dispersible grafted copolymers (C) comprise one or more oligomeric or macromolecular unit(s) (D) chosen from oxyalkylene oligomers or polymers (D1), in which the oxyalkylene repeating units are the same or different, the alkylene residue being linear or branched and containing from 2 to 4 carbon atoms, the said oligomers or polymers having an overall degree of polymerization of 2 to 3000, preferably of 5 to 500;

vinylpyrrolidone polymers or copolymers (D2) having a molecular mass of about 5000 to 1,000,000, preferably of 5000 to 400,000, and optionally containing up to 50 mol % of units derived from at least one comonomer such as N-vinylimidazole or vinyl acetate;

polyvinyl alcohols (D3) having a molecular mass of about 5000 to 1,000,000, preferably of 5000 to 400,000;

and one or more hydrophilic macromolecular unit(s) (E) chosen from those derived from random copolymers obtained from the polymerization of at least one anionic, water-soluble, ethylenically unsaturated monomer and of at least one amphoteric water-soluble ethylenically unsaturated monomer, the amount of units derived from the said amphoteric ethylenically unsaturated monomer(s) representing from 1 to 50%, preferably from 2 to 20%, of the weight of the said random copolymer (E);

the said grafted copolymers (C) being formed either of a trunk comprising an oligomeric or macromolecular unit (D) and of one or more grafts comprising a macromolecular unit (E) or of a trunk comprising a macromolecular unit (E) and of one or more graft(s) comprising an oligomeric or macromolecular unit (D1).

The said grafted copolymers (C) can have a molecular mass of about 10,000 to 10,000,000, preferably of about 50,000 to 2,000,000.

The hydrophilic unit (E) can have a molecular mass preferably of greater than 10,000. This can be up to 10,000,000.

The relative amounts of unit(s) (D) and of unit(s) (E) can correspond to a ratio of the total mass of units (D)/total mass of units (E) of about 5/100 to 50/100, preferably of about 10/100 to 30/100.

Preferably, the unit (D) is an oxyalkylene oligomer or polymer (D1). When the oxyalkylene repeating units are different, they can be distributed randomly or, preferably, in blocks.

As examples of oxyalkylene oligomers or polymers (D1), mention may be made of polyoxyethylene (POE) monoblocks, polyoxyethylene-polyoxypropylene (POE-POP) diblocks and (POE-POP-POE) triblocks.

Among the anionic, water-soluble, ethylenically unsaturated monomers from which the unit (E) is derived, mention may be made of water-soluble ethylenically unsaturated carboxylic acids, in particular acrylic, methacrylic, fumaric, maleic or itaconic acid or anhydride, N-methacroylalanine, N-acryloylhydroxyglycine, etc. or water-soluble salts thereof, sulfonated or phosphonated water-soluble ethylenically unsaturated monomers such as, in particular, sulfopropyl acrylate or water-soluble salts thereof, water-soluble styrene sulfonates, or vinylphosphonic acid and water-soluble salts thereof.

Among the amphoteric, water-soluble, ethylenically unsaturated monomers from which the unit (E) is derived, mention may be made in particular of N,N-dimethyl-N-methacryloxyethyl-N-(3-sulfopropyl)ammonium sulfobetaine, methacrylic acid amidopropyldimethylammonium betaine, 1-vinyl-3-(3-sulfopropyl)imidazolidium betaine, and 2-vinylpyridinium sulfopropylbetaine.

The hydrophilic macromolecular unit (E) can optionally also contain units derived from ethylenically unsaturated comonomers other than those which are anionic or amphoteric; in particular, it can contain units derived from nonionic, ethylenically unsaturated comonomers, which are preferably hydrophilic; such units can be present in an amount such that the said copolymer (C) is at least water-dispersible, preferably water-soluble.

Among the nonionic comonomers, mention may be made of hydroxyethyl acrylate, hydroxyethyl methacrylate, methoxyethyl acrylate, acrylamide, N-dimethylaminomethyl methacrylate, methyl or ethyl acrylate or methacrylate, vinyl acetate, methyl or ethyl vinyl ether, N-vinylpyrrolidone, styrene, vinyl chloride and acrylonitrile.

The said copolymers (C) which form the subject of the invention can be obtained according to the known techniques for the preparation of grafted copolymers.

The copolymers consisting of a trunk comprising an oligomeric or macromolecular unit (D) and of one or more grafts comprising a macromolecular unit (E) can be prepared by radical polymerization, preferably in the aqueous phase, of the ethylenically unsaturated monomers from which the units (E) are derived, in the presence of an oligomer, polymer or copolymer from which the unit (D) is derived.

The polymerization operation is preferably performed in the aqueous phase, in the presence of a polymerization initiator which is preferably water-soluble, at a temperature of about 20 to 100° C., preferably of about 50 to 95° C.

As examples of polymerization initiators, mention may be made of water-soluble initiators such as aqueous hydrogen peroxide solution, alkaline persulfates, redox systems based on an oxidizing agent such as aqueous hydrogen peroxide solution or alkaline persulfates, and on a reducing agent such as alkaline bisulfites, or azo initiators such as azobisisobutyro-nitrile, 2,2'-azobis[2-methyl-N-(2-hydroxyethyl)propionamide] or 4,4'-azobis(4-cyanovaleric acid).

The amount of initiator used can be from about 0.01 to 2%, preferably from 0.05 to 0.3%, by weight relative to the total weight of ethylenically unsaturated monomers constituting the units (E) and of oligomer, polymer or copolymer constituting the unit (D).

Preferably, the ethylenically unsaturated monomers from which the unit (E) is derived are introduced continuously into an aqueous reaction medium containing the oligomer, polymer or copolymer (D) and the initiator, at a temperature of about 20 to 100° C., preferably of about 50 to 95° C.

The copolymer (C) obtained is in the form of an aqueous solution containing about 10 to 30% solids. If desired, it can be separated from the aqueous medium, for example by drying, acidification or another known method.

The copolymers consisting of a trunk comprising a macromolecular unit (E) and of one or more graft(s) comprising an oxyalkylene oligomeric or macromolecular unit (D1) can be prepared by radical copolymerization, in the aqueous phase, of the ethylenically unsaturated monomers from which the unit (E) is derived, in the presence of an ether of an oxyalkylene oligomer, polymer or copolymer terminated by an ethylenically unsaturated function (for example acrylate or methacrylate) from which the units (D1) are derived; this type of procedure is described in particular in EP-A-583,814, EP-A-182,523 or EP-A-522,668;

or by radical copolymerization of anionic monomers containing a carboxylic function and of the other ethylenically unsaturated monomers from which the unit (E) is derived, followed by partial (from 0.01 to 15%) amidation or esterification reaction of the pendant carboxylic acid functions of the random copolymer obtained by an ether of an oxyalkylene oligomer, polymer or copolymer terminated with an OH or $NH_2$ function; this type of procedure is described in particular in EP-A-182,523, EP-A-522,668 or WO 95/24430.

The present invention is directed most particularly towards grafted copolymers (C) formed of a trunk comprising an oxyalkylene oligomer or polymer unit (D1) as defined above and of one or more grafts comprising a macromolecular unit (E) as defined above.

By way of example, mention may be made of grafted copolymers with a molecular mass of about $10^4$ to $10^7$, having a trunk consisting of a polyoxyethylene block with a molecular mass of about $10^2$ to $2 \times 10^5$, and of grafts consisting of random units derived from acrylic acid and from N,N-dimethyl-N-(2-ethyl methacrylate)-N-(3-sulfopropyl)ammonium sulfobetaine.

The grafted copolymers (C) which form the subject of the invention can be used in compositions comprising a biocide which are intended to be applied to or placed in contact with a surface, the said copolymers allowing the vectorization of the said biocide towards the said surface and/or the controlled release of the said biocide.

In this specification, all parts, percentages, ratios, averages and the like are by weight, unless otherwise apparent to one of ordinary skill from the context of use.

The following examples are given by way of illustration.

EXAMPLE 1

60 g of sodium hydroxide are dissolved in 3900 g of water, at room temperature, in a 6-liter glass reactor fitted with a jacket and a stirring system (120 rev/min). The temperature is then increased to 65° C.

The following are prepared:
an initiator solution comprising 1.26 g of ammonium persulfate and 50 g of water (Solution 1)
a solution comprising 500 g of water and 320 g of acrylic acid (Solution 2), and
a solution comprising 60 g of sodium hydroxide and 180 g of water (Solution 3).

63 g of polyethylene oxide (molecular mass of 20,000 g/mol) and 37.8 g of N,N-dimethyl-N-(2-ethyl methacrylate)-N-(3-sulfopropyl)ammonium sulfobetaine are dissolved in the sodium hydroxide solution at 65° C. contained in the reactor. Solution 1 is introduced continuously over 150 minutes, Solution 2 over 120 minutes and Solution 3 over 120 minutes.

Once the introductions are complete (150 minutes), the temperature is increased over 30 minutes to 80° C., after which a solution of 0.32 g of ammonium persulfate in 10 g of water and a solution of 0.16 g of sodium bisulfite in 10 g of water are added.

The reaction mixture is then left stirring for 120 minutes at 80° C. The mixture is finally cooled to room temperature.

A solution of grafted copolymer is obtained.

The molecular mass of the grafted copolymer can be measured by Gel Permeation Chromatography under the following conditions: four (4) column TSK gel; eluent of water/acetonitrile 80/20 vol % plus 0.1M sodium nitrate plus 150 ppm sodium azide; and flowrate 1 ml/mn. The results should be weight average molecular mass expressed as polyoxyethylene equivalents.

What is claimed is:

1. Water-soluble or water-dispersible grafted copolymers comprising:
    (a) one or more oligomeric or macromolecular units chosen from
        (i) oxyalkylene oligomers or polymers, in which the oxyalkylene repeating units are the same or different, the alkylene residue being linear or branched and containing from 2 to 4 carbon atoms, said oligomers or polymers having an overall degree of polymerization of 2 to 3000;
        (ii) vinylpyrrolidone polymers or copolymers having a molecular mass of about 5000 to 1,000,000, and optionally containing up to 50 mol % of units derived from at least one comonomer;
        (iii) polyvinyl alcohols having a molecular mass of about 5000 to 1,000,000; and
    (b) one or more hydrophilic macromolecular units chosen from those derived from random copolymers obtained from the polymerization of at least one anionic, water-soluble, ethylenically unsaturated monomer and of at least one amphoteric, water-soluble, ethylenically unsaturated monomer, the amount of units derived from said amphoteric, ethylenically unsaturated monomers representing from 1 to 50% of the weight of said random copolymer;
said grafted copolymers being formed either of a trunk comprising said one or more oligomeric or macromolecular units and of one or more grafts comprising said one or more hydrophilic macromolecular units or of a trunk comprising said one or more hydrophilic macromolecular units and of one or more grafts comprising said one or more oligomeric or macromolecular units.

2. Copolymers according to claim 1 wherein said one or more oligomeric or macromolecular units are chosen from said oxyalkylene oligomers or polymers, in which the oxyalkylene repeating units are the same or different, the alkylene residue being linear or branched and containing from 2 to 4 carbon atoms, said oligomers or polymers having an overall degree of polymerization of 5 to 500.

3. Copolymers according to claim 1 wherein said one or more oligomeric or macromolecular units are chosen from said vinylpyrrolidone polymers or copolymers having a molecular mass of about of 5000 to 400,000, and optionally containing up to 50 mol % of units derived from at least one comonomer.

4. Copolymers according to claim 3 wherein said comonomers are N-vinylimidazole or vinyl acetate.

5. Copolymers according to claim 1 wherein said one or more oligomeric or macromolecular units are chosen from said polyvinyl alcohols having a molecular mass of about 5000 to 400,000.

6. Copolymers according to claim 1 wherein said amphoteric, ethylenically unsaturated monomers represent from 2 to 20%, of the weight of said random copolymer.

7. Copolymers according to claim 1, wherein said copolymers have a molecular mass of about 10,000 to 10,000,000.

8. Copolymers according to claim 1, wherein said copolymers have a molecular mass of about 50,000 to 2,000,000.

9. Copolymers according to claim 1, wherein said hydrophilic macromolecular unit has a molecular mass of greater than 10,000 and up to 10,000,000.

10. Copolymers according to claim 1, wherein the relative amounts of said oligomeric or macromolecular units and of said hydrophilic macromolecular units correspond to a ratio of the total mass of said oligomeric or macromolecular units/total mass of said hydrophilic macromolecular units of about 5/100 to 50/100.

11. Copolymers according to claim 1, wherein the relative amounts of said oligomeric or macromolecular units and of said hydrophilic macromolecular units correspond to a ratio of the total mass said oligomeric or macromolecular units/total mass of said hydrophilic macromolecular units of about 10/100 to 30/100.

12. Copolymers according to claim 1, wherein the trunk or the grafts comprising said oligomeric or macromolecular units are an oxyalkylene oligomer or polymer chosen from polyoxyethylene monoblocks, polyoxyethylene-polyoxypropylene diblocks and triblocks.

13. Copolymers according to claim 1, wherein the anionic, water-soluble, ethylenically unsaturated monomer is chosen from water-soluble, ethylenically unsaturated carboxylic acids and sulfonated or phosphonated, water-soluble, ethylenically unsaturated monomers.

14. Copolymers according to claim 1, wherein the anionic, water-soluble, ethylenically unsaturated monomer is chosen from acrylic, methacrylic, fumaric, maleic or itaconic acid or anhydride, N-methacroylalanine, N-acryloylhydroxyglycine, or water-soluble salts thereof.

15. Copolymers according to claim 1, wherein the anionic, water-soluble, ethylenically unsaturated monomer is chosen from sulfopropyl acrylate or water-soluble salts thereof, water-soluble styrene sulfonates, or vinylphosphonic acid and water-soluble salts thereof.

16. Copolymers according to claim 1, wherein the amphoteric, water-soluble, ethylenically unsaturated monomer is chosen from N,N-dimethyl-N-methacryloxyethyl-N-(3-sulfopropyl)ammonium sulfobetaine, methacrylic acid amidopropyldimethylammonium betaine, 1-vinyl-3-(3-sulfopropyl)imidazolidium betaine, and 2-vinylpyridinium sulfopropylbetaine.

17. Copolymers according to claim 1, wherein said copolymers are formed of a trunk comprising an oxyalkylene oligomer or polymer unit and of one or more grafts comprising a hydrophilic macromolecular unit.

18. Copolymers according to claim 1, wherein said copolymers have a molecular mass of about $10^4$ to $10^7$ and are formed of a trunk consisting of a polyoxyethylene block with a molecular mass of about $10^2$ to $2 \times 10^5$, and of grafts consisting of random units derived from acrylic acid and from N,N-dimethyl-N-(2-ethyl methacrylate)-N(3-sulfopropyl)ammonium sulfobetaine.

19. Copolymers according to claim 1, wherein said copolymers are formed of a trunk comprising an oligomeric or macromolecular unit and of one or more grafts comprising a macromolecular unit and can be obtained by radical polymerization of the ethylenically unsaturated monomers from which the units are derived, in the presence of an oligomer, polymer or copolymer from which the unit is derived.

20. Copolymers according to claim 19, wherein said radical polymerization is in aqueous phase.

21. Copolymers according to claim 19, wherein the ethylenically unsaturated monomers from which said hydrophilic macromolecular units are derived are introduced continuously into an aqueous reaction medium containing the oligomer, polymer or copolymer and the radical polymerization initiator, at a temperature of about 20 to 1000° C.

22. Copolymers according to claim 21 wherein said temperature is about 50 to 95° C.

* * * * *